(12) United States Patent
Mann

(10) Patent No.: US 6,272,627 B1
(45) Date of Patent: Aug. 7, 2001

(54) METHOD AND APPARATUS FOR BOOTING UP A COMPUTING SYSTEM WITH ENHANCED GRAPHICS

(75) Inventor: Albert Mann, Richmond Hill (CA)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/183,882

(22) Filed: Oct. 30, 1998

(51) Int. Cl.$^7$ ................................................ G06F 15/177
(52) U.S. Cl. ........................ 713/2; 345/501; 345/522; 710/10
(58) Field of Search ...................... 713/2, 1; 345/501, 345/519, 521, 522; 710/10

(56) References Cited

U.S. PATENT DOCUMENTS

| 5,884,074 | * | 3/1999 | Maeda et al. | 713/2 |
| 5,889,987 | * | 3/1999 | Nelson et al. | 713/2 |
| 5,943,064 | * | 8/1999 | Hong | 345/502 |
| 5,987,605 | * | 11/1999 | Hill et al. | 713/2 |

OTHER PUBLICATIONS

Chapter 7 of PCI Local Bus Specification Rev. 2.1 entitled "66 MHz PCI Specification," no date, author unknown.*
Chapter 9 of System BIOS for IBM PC/XT/AT Computers and Compatibles entitled "INT 10h Video Service", no date, author unknown.*

* cited by examiner

Primary Examiner—Thomas Black
Assistant Examiner—Mary Wang
(74) Attorney, Agent, or Firm—Vedder, Price, Kaufman & Kammholz

(57) ABSTRACT

A method and apparatus for booting up a computing system having enhanced graphics and increased boot up speed begins by obtaining header information from a graphics controller. The header information includes a ROM signature, initialization size of the boot up algorithm, an entry point for the boot up algorithm, and at least one extended mode identifier. The processing then continues by interpreting the header information to determine whether the graphics controller is to boot up in an extended operating mode. When the graphics controller is to boot up in the extended operating mode, the processing continues by allocating memory for storing a boot up algorithm of the graphics controller. Next the processing continues by providing an address pointer to the graphics controller, where the address pointer points to the memory where the boot up algorithm is stored. The processing then continues as the graphics controller is booted up by accessing the boot up algorithm directly from the memory at the address indicated by the address pointer.

29 Claims, 3 Drawing Sheets

METHOD AND APPARATUS FOR BOOTING UP A COMPUTING SYSTEM WITH ENHANCED GRAPHICS

TECHNICAL FIELD OF THE INVENTION

This invention relates generally to computing systems and more particularly to booting up such computing systems with enhanced graphics.

BACKGROUND OF THE INVENTION

FIG. 1 illustrates a schematic block diagram of a computing system 10 and a corresponding boot up process for the computing system and video graphics cards wherein the boot up is in accordance with the PCI local bus spec 2.1 and VGA video bus specification (i.e., Interrupt 10H). As shown, the computing system 10 includes a central processing unit 12, a system BIOS module 14, system memory 16, a first video graphics card 18 and may also include a second video graphics card 20. Note, however, that many computing systems only include one video graphics card.

The video graphics card 18 includes a ROM 22 and a graphics controller circuit 24. The ROM 22 stores a video graphics boot up algorithm and is identified with a header that includes a flag "55AA" followed by the length of the ROM. Note that the ROM 22 may alternatively be part of the system BIOS module 14. The graphics controller 24 includes a frame buffer 26 for storing RGB data that is to be provided to a monitor. The graphics controller 24 further includes configuration space 28, which is arranged in accordance with the PCI spec 2.1. As such, the configuration space 28 includes a vender ID field, a device ID field, a command field, status field, vision ID field, class code field and header type fields. In addition, the configuration space 28 includes an assigned address field 30, which stores the address of system memory 16 in which the boot up algorithm is stored.

At the initial boot up of the computing system 10, the system BIOS module 14 executes the boot up algorithm stored in the reserved boot up memory 32 of system memory 16. The reserved boot up memory 32 includes one megabyte of space for storing a plurality of boot up algorithms, where physical or virtual memory locations C000-CFFF are reserved for the video graphics boot up algorithm. Such memory allocation is based on the interrupt 10-H video specification.

During the boot up process, the system BIOS module 14 causes the boot up algorithm stored in ROM 22 to be written into system memory at the assigned address stored in the configuration space at field 30. Having copied the boot up algorithm of the video graphics card into the system memory 16 at the assigned address, the algorithm is again copied, or remapped, into system memory at C00-CFFF to conform with the 10-H interrupt requirements. Thus, the video graphics boot up algorithm is actually, or effectively, copied twice, first into the allocated memory 34, and second into the reserved boot up memory 32.

After the video graphic boot up algorithm is executed, the system finishes the initial boot up process in a DOS mode. As such, text is displayed. Once the initial boot up process has ended, the operating system boot up process commences. During the operating system boot up process, the video graphics circuit is initiated to perform graphics operations, but limited to DOS parameters. In addition, because the video graphics boot up is limited to 32 to 64 kilobits of memory and requires VGA controller functionality, it has limited functional capabilities, which limits the speed and graphics options at which a computer can boot up.

Therefore, a need exists for a method and apparatus that allows the video graphics card to boot up in a graphics mode thus providing a boot up process for a computing system that includes enhanced graphics and increased speed.

DETAILED DESCRIPTION OF A PREFERRED EMBODIMENT

Generally, the present invention provides a method and apparatus for booting up a computing system having enhanced graphics and increased boot up speed. Such process begins by obtaining header information from a graphics controller. The header information includes a ROM signature, initialization size of the boot up algorithm, an entry point for the boot up algorithm, and at least one extended mode identifier. The processing then continues by interpreting the header information to determine whether the graphics controller is to boot up in an extended operating mode. When the graphics controller is to boot up in the extended operating mode, the processing continues by allocating memory for storing a boot up algorithm of the graphics controller. Next the processing continues by providing an address pointer to the graphics controller, where the address pointer points to the memory where the boot up algorithm is stored. The processing then continues as the graphics controller is booted up by accessing the boot up algorithm directly from the memory at the address indicated by the address pointer. With such a method and apparatus, the interrupt 10-H requirement of previous boot up specifications is overcome. By overcoming this limitation, the video graphics boot up algorithm allows the computer to boot up with enhanced graphics and at faster speeds.

Figure 2:
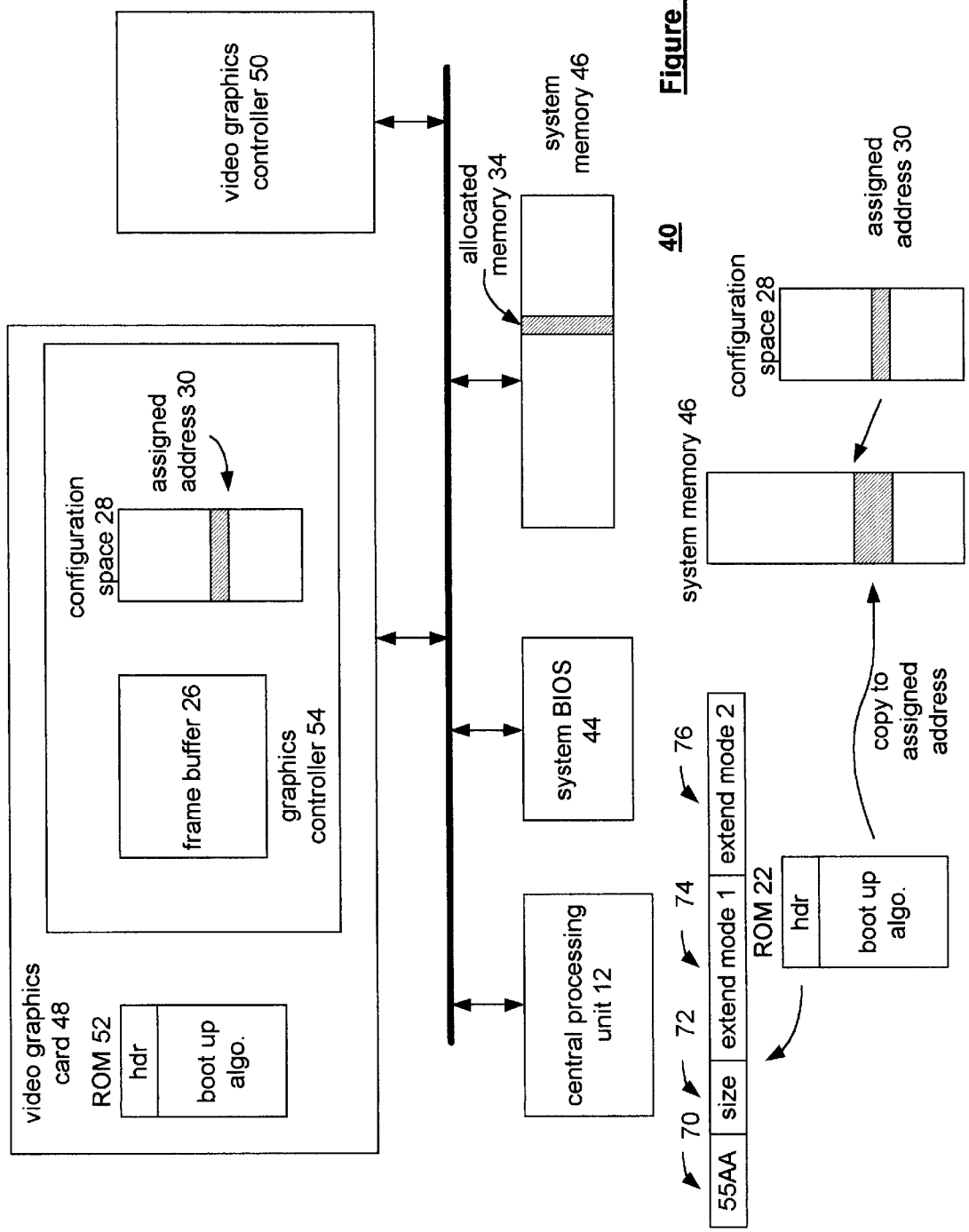
FIG. 2 illustrates a schematic block diagram of a computing system in accordance with the present invention.

The present invention can be more fully described with reference to FIGS. 2 and 3. FIG. 2 illustrates a schematic block diagram of a computing system 40. The computing system 40 may be a personal computer, laptop computer, video game, personal digital assistant, hand-held computer and/or any device that manipulates digital information based on operating instructions. The computing system 40 includes a central processing unit 12, a system BIOS module 44, system memory 46, a first graphics card 48, and a second video graphics controller 50. Note that the computing system 40 may include only a single video graphics card or multiple video graphics cards. The central processing unit 12 may be a microprocessor or a plurality of microprocessors as is found in personal computers, laptop computers, etc. The system BIOS module 44 is as is found in personal and laptop computers as modified in accordance with the teachings of the present invention.

The video graphics card 48 includes a ROM 52, which includes a header portion and a boot up algorithm portion, and a graphics controller 54. The graphic controller 54 includes memory such as the frame buffer 26 and the configurations space 28. The video graphics card 48 is of the type found in ATI International's All-In-Wonder Board as modified in accordance with the present invention. Note that the ROM 52 may alternatively be contained on the system BIOS module 44, or at another location in the computer system 40.

In the boot up operation, the system BIOS module 44 retrieves the information stored in ROM 52 from video graphics card 48. If multiple video graphics cards are included, the system BIOS module 44 retrieves the corresponding information from each video graphics card. Upon receiving the information from the ROM 52, the system BIOS module 44 interprets the header to determine whether the video graphics card is to operate in an extended mode. If the header includes a first extended mode identifier for VGA compatible extended operating mode 74 or a second extended mode identifier for non-VGA compatible extended operating mode, the video graphics card 48 is to operate in the extended mode. Note that the header also includes a ROM signature 70, an initialization size of the boot up algorithm 72, and an entry point for the boot up algorithm (which indicates the starting address of the algorithm). If the header includes the first extended mode identifier 74, the system BIOS module 44 allows the video graphics card to boot up in a first extended mode. If, however, the header includes the second extended mode identifier 76, the system BIOS module 44 allows the video graphics card to boot up in a second extended mode.

In the first or the second extended mode, the video graphics boot up algorithm is copied from the ROM 52 into the assigned address of system memory 46. The boot up algorithm is not further copied into the reserved memory space for boot up as required by the interrupt 10-H. As such, the video graphics card boot up algorithm may be significantly larger than the 32 K to 64 K restriction of previous boot up algorithms. By removing this restriction, the boot up algorithm may allow the video graphics card, and subsequently the computing system to boot up in a graphical manner as opposed to a DOS manner. As such, the computing system may provide various types of graphical images during the boot up process as opposed to just text images as is currently done. In addition, a prior art restriction of having only one VGA video graphics card has been removed as well as the need for a VGA video graphics card.

In the first extended mode, the video graphics card 38 is backward compatible with the legacy boot up process as discussed in the background section. In this mode, the video graphics card can support the legacy boot up process when the system BIOS module 44 is not capable of supporting the extended mode, or when the legacy boot up process has been selected by the user, and/or system default settings. In the second extended mode, the video graphics card is not backward compatible with the legacy system. As such, the video graphics card will only boot up in the extended mode, thereby requiring the system BIOS module 44 to be appropriately programmed.

By eliminating the interrupt 10-H requirements, which operates with 16 bits of bandwidth, the extended mode operation allows for the boot up for the entire computer, or selected components thereof, to occur at the data bandwidth of the central processing unit. As such, a 32 bit data bus corresponding to the central processing unit allows the boot up process to occur at a 32 bit bandwidth thereby improving the efficiency and speed at which the computing system boots up.

Figure 3:
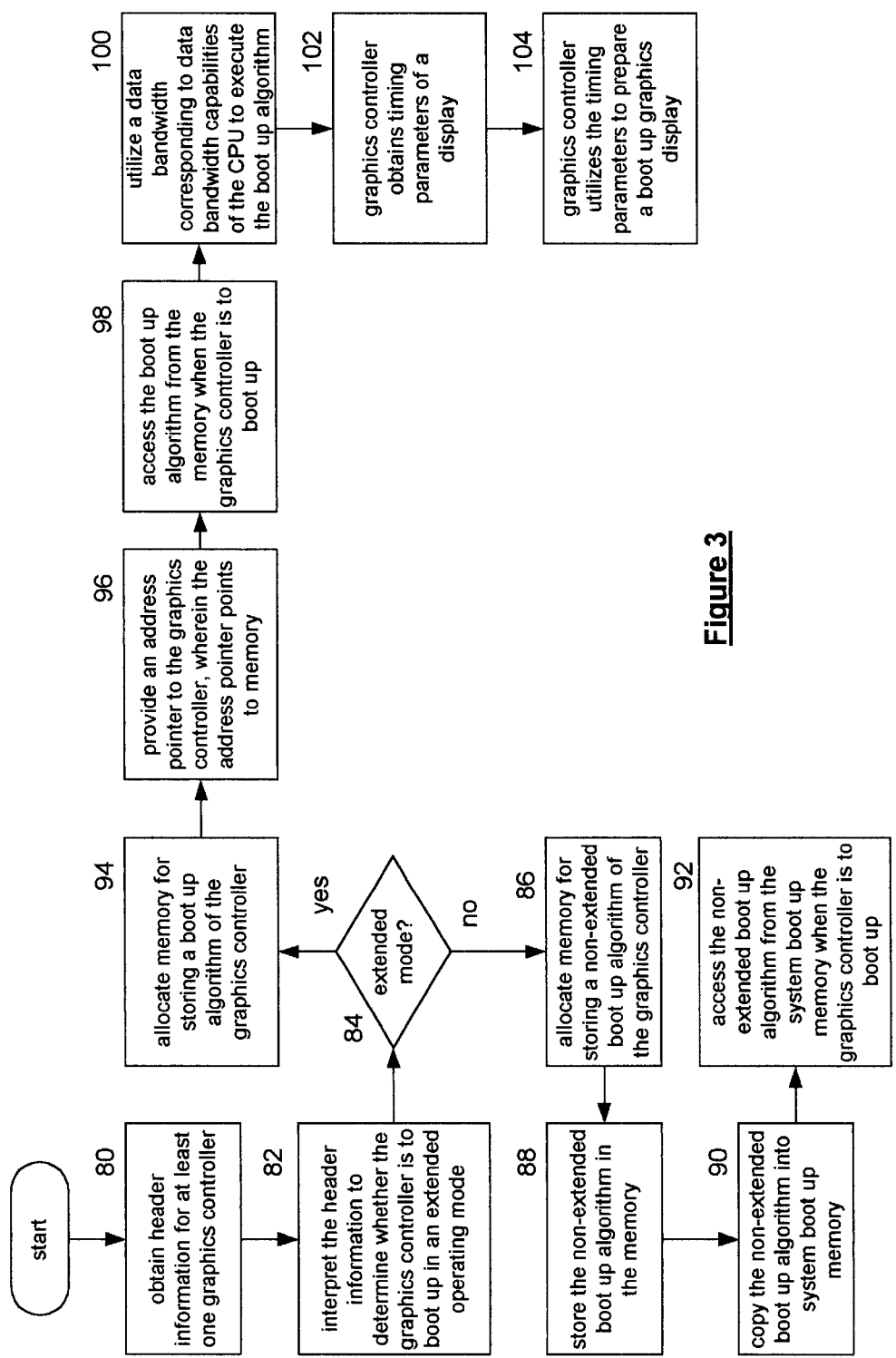
FIG. 3 illustrates a logic diagram of a method for booting up a computing system having enhanced graphics in accordance with the present invention.

FIG. 3 illustrates a logic diagram of a method for booting up a computing system having enhanced graphics in accordance with the present invention. Such a process will typically be performed by the system BIOS module 44 independently or in combination with the central processing unit 12 and/or the video graphics card 48. In an embodiment of the system BIOS module 44, it includes a processing module and memory. The processing module may be a single processing entity or a plurality of processing entities. Such a processing entity may be a microprocessor, microcomputer, microcontroller, the central processing unit or portion thereof digital signal processor, state machine, logic circuitry, and/or any device that manipulates information based on operational instructions. The memory may be a single memory device or a plurality of memory devices. Such a memory device may be a read-only memory, random access memory, system memory or portion thereof floppy disk memory, hard disk memory, reprogrammable memory, magnetic tape memory, DVD memory, and/or any device that stores digital information. Note that if the processing module implements one or more of its functions using a state machine or logic circuitry, the memory storing the corresponding operational instructions is embedded within the circuitry that comprises the state machine and/or logic circuitry.

The process begins at step 80 where header information is obtained from at least one graphics controller. The header information includes a ROM signature (e.g., 55AA), initialization size of the boot up algorithm, entrance point of the boot up algorithm, extended mode identifier for VGA compatible extended operating mode, and/or a second extended mode identifier for non-VGA compatible extended operating modes. The process then proceeds to step 82 where the header information is interpreted to determine whether the graphics controller is to boot up the extended operating mode. Such interpreting is done by determining whether the extended mode identifier for VGA compatible extended operating mode or the extended mode identifier for non-VGA compatible extended operating mode is set, and/or includes a code word that identifies the particular operating mode. Note that the data word to identify the extended operating mode needs to be such that it is not confused with an operational instruction and/or other header information (e.g., FAAF FAAF).

The process then proceeds to step 84 where a determination is made as to whether the extended mode is enabled. Note that if the computing system includes a plurality of graphic controllers and/or video graphics cards, the processing steps of 80 through 84 are performed for each of the graphics controllers and/or video graphics cards. In addition, the subsequent steps are performed for each of the graphics controllers. As such, each video graphics card, as it boots up, can independently display its own unique graphics images. As an alternative, one of the graphics controllers may be designated as the primary controller, which provides the extended mode information. As such, only one graphics controller header needs to be interpreted to identify the extended mode, with the others being able to include extended mode boot up algorithms.

Figure 1:
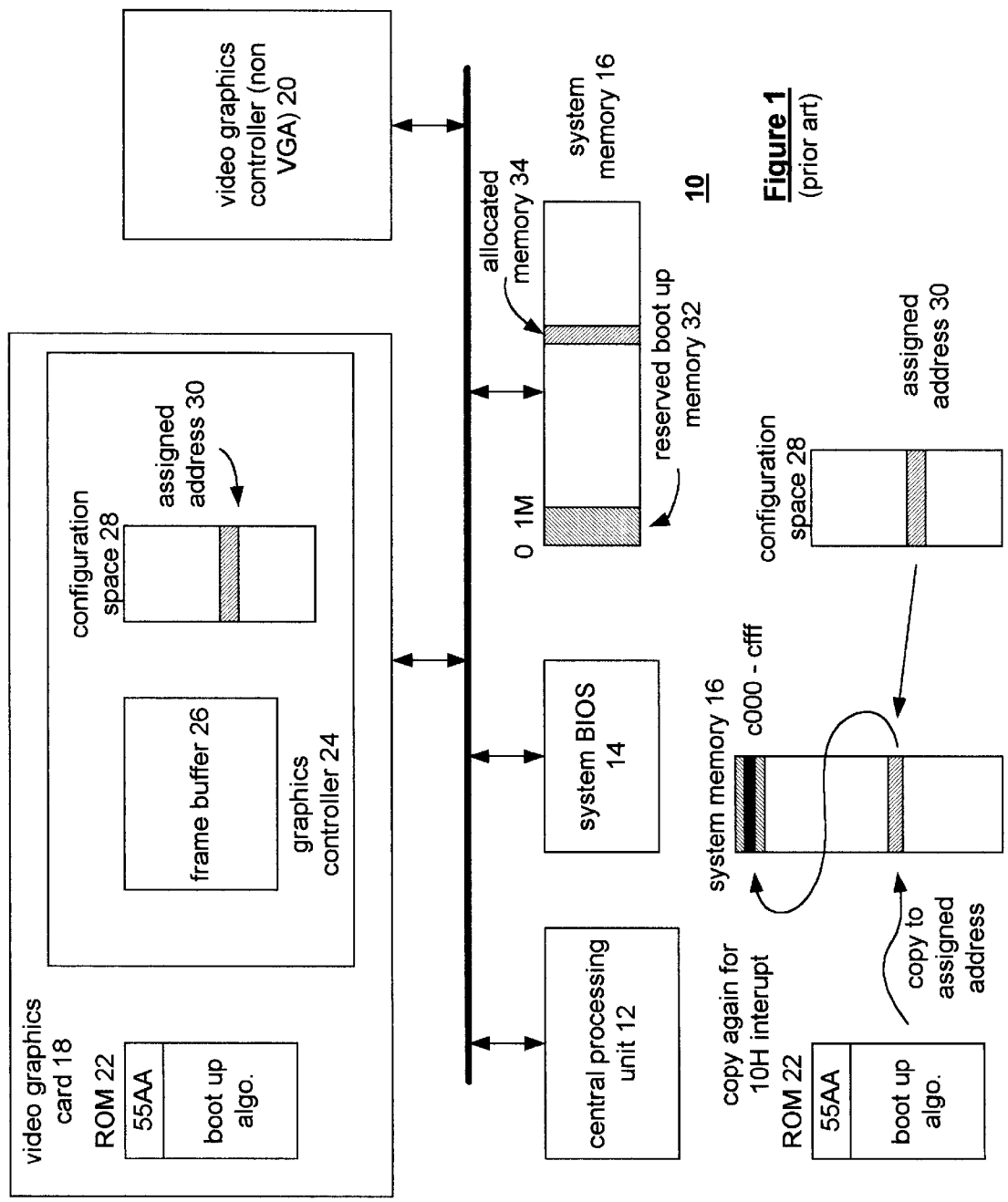
FIG. 1 illustrates a prior art schematic block diagram of a computing system.

If the extended mode is not enabled, the process proceeds to steps 86 through 92 which correspond to the legacy operation. At step 86, memory is allocated for storing a non-extended boot up algorithm of the graphics controller. The process then proceeds to step 88 where the non-extended boot up algorithm is stored in the allocated memory. The process then proceeds to step 90 where the non-extended boot up algorithm is copied from the allocated memory into reserved memory for system boot up of the system memory. The process then proceeds to step 92 where the non-extended boot up algorithm is accessed from the reserved memory of the system boot memory when the graphics controller is to boot up. Such a boot up process was illustrated and discussed with reference to FIG. 1.

If the extended mode is enabled, the process proceeds to step 94 where memory for storing a boot up algorithm of the graphics controller is allocated. The process then proceeds to step 96 where an address pointer is provided to the graphics controller, where the address pointer points to the memory at which the boot up algorithm is stored.

The process then proceeds to step 98 where the boot up algorithm is accessed from the memory when the graphics controller is to boot up, thereby avoiding the redundant copying and size restrictions of the legacy boot up process. The process then proceeds to step 100 where a bandwidth corresponding to the data bandwidth capabilities of the CPU are utilized to execute the boot up algorithm. The process then proceeds to step 102 where the graphics controller obtains timing parameters (e.g., resolution, refresh rate, and/or pixel depth) of the associated display or displays from the displays themselves or via default display settings. The process then proceeds to step 104 where the graphics controller utilizes the timing parameters to perform a boot up graphics display. Such a boot up graphics display bypasses the DOS operating mode such that the system comes up with graphical display as opposed to a DOS based display. As such, the programmer of the graphical boot up display has substantial leeway in the graphics to be displayed during boot up.

The preceding discussion has presented a method and apparatus for booting up a computing system having enhanced graphics during the boot up process. By eliminating the need for the interrupt 10-H requirements, the boot up algorithm for the video graphics card can exceed the 32 k to 64 k size limitation. This can be done with backward compatibility to existing boot up algorithms that utilize the VESA/VBE video spec and/or the interrupt 10-H boot up specification As one in average skill in the art will appreciate that other embodiments of the present invention may be derived from the teachings disclosed herein without deviating from the spirit of the present invention.

What is claimed is:

1. A method for booting up a computing system, the method comprises the steps of:
   (a) obtaining header information from a graphics controller, the header information having at least an extended mode identifier;
   (b) interpreting the header information to determine whether the graphics controller is to boot up in an extended operating mode by identifying the extended mode identifier as indicating one of VGA compatible extended operating mode and non-VGA compatible extended operating mode, when the graphics controller is to boot up in the extended operating mode:
   (c) allocating memory for storing a boot up algorithm of the graphics controller;
   (d) providing an address pointer to the graphics controller wherein the address pointer points to the memory; and
   (e) when the graphics controller is to boot up, accessing the boot up algorithm from the memory.

2. The method of claim 1 further comprises, when the graphics controller is not to boot up in the extended operating mode,
   allocating memory for storing a non-extended boot up algorithm of the graphics controller;
   storing the non-extended boot up algorithm in the memory;
   copying the non-extended boot up algorithm into system boot up memory; and when the graphics controller is to boot up, accessing the non-extended boot up algorithm from the system boot up memory.

3. The method of claim 1, wherein the header information includes at least one of: a ROM signature, initialization size of the boot up algorithm, entry point for the boot up algorithm, an extended mode identifier for VGA compatible extended operating mode, and an extended mode identifier for non-VGA compatible extended operating mode.

4. The method of claim 3, wherein step (b) further comprises identifying the extended mode identifier for VGA compatible extended operating mode or the extended mode identifier for non-VGA compatible extended operating mode.

5. The method of claim 1 further comprises:
   obtaining individual header information from a plurality of graphic controllers;
   interpreting the individual header information of each of the plurality of graphics controllers to determine whether the graphics controller is to boot up in an extended operating mode;
   for each of the plurality of graphics controllers that is to boot up in the extended operating mode:
   allocating memory for storing an individual boot up algorithm;
   providing an address pointer to the each of the plurality of graphics controllers,
   wherein the address pointer points to the memory; and when booting up, accessing the individual boot up algorithm from the memory.

6. The method of claim 1 further comprises, while executing the boot up algorithm:
   obtaining, by the graphics controller, timing parameters of a display;
   utilizing, by the graphics controller, the timing parameters to prepare a graphics display.

7. The method of claim 1 further comprises:
   utilizing a data bandwidth corresponding to data bandwidth capabilities of a central processing unit to execute the boot up algorithm.

8. A computing system comprises:
   a processing module; and
   memory operably coupled to the processing module, wherein the memory includes operational instructions that cause the processing module to (a) obtain header information from a graphics controller the header information having at least an extended mode identifier; (b) interpret the header information to determine whether the graphics controller is to boot up in an extended operating mode by identifying the extended mode identifier as indicating one of VGA compatible extended operating mode and non-VGA compatible extended operating mode;
   when the graphics controller is to boot up in the extended operating mode:
   (c) allocate memory for storing a boot up algorithm of the graphics controller; (d) provide an address pointer to the graphics controller, wherein the address pointer points to the memory; and (e) access the boot up algorithm from the memory when the graphics controller is to boot up.

9. The computing system of claim 8, wherein the memory further comprises operational instructions that cause the processing module to:
   when the graphics controller is not to boot up in the extended operating mode,
   allocate memory for storing a non-extended boot up algorithm of the graphics controller;

store the non-extended boot up algorithm in the memory;

copy the non-extended boot up algorithm into system boot up memory; and access the non-extended boot up algorithm from the system boot up memory when the graphics controller is to boot up.

10. The computing system of claim 8, wherein the header information includes at least one of: a ROM signature, initialization size of the boot up algorithm, entry point for the boot up algorithm, an extended mode identifier for VGA compatible extended operating mode, and an extended mode identifier for non-VGA compatible extended operating mode.

11. The computing system of claim 8, wherein the memory further comprises operational instructions that cause the processing module to interpret the header information by identifying the extended mode identifier for VGA compatible extended operating mode or the extended mode identifier for non-VGA compatible extended operating mode.

12. The computing system of claim 8, wherein the memory further comprises operational instructions that cause the processing module to:

obtain individual header information from a plurality of graphic controllers;

interpret the individual header information of each of the plurality of graphics controllers to determine whether the graphics controller is to boot up in an extended operating mode;

for each of the plurality of graphics controllers that is to boot up in the extended operating mode:

allocate memory for storing an individual boot up algorithm;

provide an address pointer to the each of the plurality of graphics controllers, wherein the address pointer points to the memory; and access the individual boot up algorithm from the memory when booting up.

13. The computing system of claim 8, wherein the memory further comprises operational instructions that cause the processing module to utilize a data bandwidth corresponding to data bandwidth capabilities of a central processing unit to execute the boot up algorithm.

14. A digital storage medium for storing operation instructions that cause a processing module to boot up a computing system, the digital storage medium comprises:

first storage means for storing operation instructions that cause the processing module to obtain header information regarding a graphics controller, the header information having at least an extended mode identifier;

second storage means for storing operation instructions that cause the processing module to interpret the header information to determine whether the graphics controller is to boot up in an extended operating mode by identifying the extended mode identifier as indicating one of VGA compatible extended operating mode and non-VGA compatible extended operating mode;

when the graphics controller is to boot up in the extended operating mode:

third storage means for storing operational instructions that cause the processing module to allocate memory for storing a boot up algorithm of the graphics controller;

fourth storage means for storing operational instructions that cause the processing module to provide an address pointer to the graphics controller, wherein the address pointer points to the memory; and fifth storage means for storing operational instructions that cause the processing module to access the boot up algorithm from the memory when the graphics controller is to boot up.

15. The digital storage medium of claim 14 further comprises means for storing operational instructions that cause the processing module to, when the graphics controller is not to boot up in the extended operating mode, allocate memory for storing a non-extended boot up algorithm of the graphics controller;

store the non-extended boot up algorithm in the memory;

copy the non-extended boot up algorithm into system boot up memory; and access the non-extended boot up algorithm from the system boot up memory when the graphics controller is to boot up.

16. The digital storage medium of claim 14, wherein the header information includes at least one of: a ROM signature, initialization size of the boot up algorithm, entry point for the boot up algorithm, an extended mode identifier for VGA compatible extended operating mode, and an extended mode identifier for non-VGA compatible extended operating mode.

17. The digital storage medium of claim 16 further comprises means for storing operational instructions that cause the processing module to interpret the header information by identifying the extended mode identifier for VGA compatible extended operating mode or the extended mode identifier for non-VGA compatible extended operating mode.

18. The digital storage medium of claim 14 further comprises means for storing operational instructions that cause the processing module to:

obtain individual header information from a plurality of graphic controllers;

interpret the individual header information of each of the plurality of graphics controllers to determine whether the graphics controller is to boot up in an extended operating mode;

for each of the plurality of graphics controllers that is to boot up in the extended operating mode:

allocate memory for storing an individual boot up algorithm;

provide an address pointer to the each of the plurality of graphics controllers, wherein the address pointer points to the memory; and access the individual boot up algorithm from the memory when booting up.

19. A method for a graphics controller to boot up, the method comprises the steps of:

a) providing header information, wherein the header information includes an extended mode identifier;

b) providing an extended boot-up algorithm to memory, when prompted by identifying the extended mode identifier as indicating one of VGA compatible extended operating mode and non-VGA compatible extended operating mode; and c) storing an address pointer that points to the memory.

20. The method of claim 19 further comprises, during execution of the extended boot-up algorithm, obtaining timing parameters of a display;

utilizing the timing parameters to prepare a graphics display.

21. The method of claim 19, wherein the extended mode identifier includes at least one of: an extended mode identifier for VGA compatible extended operating mode, and an extended mode identifier for non-VGA compatible extended operating mode.

22. A graphics controller comprises:

processing module; and memory operably coupled to the processing module, wherein the memory includes operational instructions that cause the processing module to (a) provide header information, wherein the header information includes an extended mode identifier; (b) provide an extended boot-up algorithm to memory, when prompted by identifying the extended mode identifier as indicating one of VGA compatible extended operating mode and non-VGA compatible extended operating mode; and (c) store an address pointer that points to the memory.

23. The graphics controller of claim 22, wherein the memory further comprises operational instructions that cause the processing module to, during execution of the extended boot-up algorithm, obtain timing parameters of a display;

utilize the timing parameters to prepare a graphics display.

24. A method for booting up a computing system, the method comprises the steps of:

(a) obtaining header information from a graphics controller, the header information having at least an extended mode identifier;

(b) interpreting the header information to determine whether the graphics controller is to boot up in an extended operating mode by identifying the extended mode identifier as indicating one of VGA compatible extended operating mode and non-VGA compatible extended operating mode, when the graphics controller is to boot up in the extended operating mode:

(c) allocating memory for storing a boot up algorithm of the graphics controller;

(d) providing an address pointer to the graphics controller wherein the address pointer points to the memory;

(e) when the graphics controller is to boot up, accessing the boot up algorithm from the memory;

(f) using a bandwidth corresponding to data bandwidth capabilities of the computing system to execute the boot-up algorithm;

(g) obtaining timing parameters of an associated display from one of the associated display or via default display settings; and (h) using the timing parameters to perform a boot-up graphics display.

25. The method of claim 24 further comprises, when the graphics controller is not to boot up in the extended operating mode, allocating memory for storing a non-extended boot up algorithm of the graphics controller;

storing the non-extended boot up algorithm in the memory;

copying the non-extended boot up algorithm into system boot up memory; and when the graphics controller is to boot up, accessing the non-extended boot up algorithm from the system boot up memory.

26. The method of claim 24, wherein the header information includes at least one of: a ROM signature, initialization size of the boot up algorithm, entry point for the boot up algorithm, an extended mode identifier for VGA compatible extended operating mode, and an extended mode identifier for non-VGA compatible extended operation mode.

27. The method of claim 24, wherein step (b) further comprises identifying the extended mode identifier for VGA compatible extended operating mode or the extended mode identifier for non-VGA compatible extended operating mode.

28. The method of claim 24 further comprises:

obtaining individual header information from a plurality of graphic controllers;

interpreting the individual header information of each of the plurality of graphics controllers to determine whether the graphics controller is to boot up in an extended operating mode;

for each of the plurality of graphics controllers that is to boot up in the extended operating mode:

allocating memory for storing an individual boot up algorithm;

providing an address pointer to each of the plurality of graphics controllers, wherein the address pointer points to the memory; and when booting up, accessing the individual boot up algorithm from the memory.

29. A computing system comprises:

a processing module; and memory operably coupled to the processing module, wherein the memory includes operational instructions that cause the processing module to (a) obtain header information from a graphics controller, the header information having at least an extended mode identifier; (b) interpret the header information to determine whether the graphics controller is to boot up in an extended operating mode by identifying the extended mode identifier as indicating one of VGA compatible extended operating mode and non-VGA compatible extended operating mode;

when the graphics controller is to boot up in the extended operating mode:

(c) allocate memory for storing a boot up algorithm of the graphics controller; (d) provide an address pointer to the graphics controller, wherein the address pointer points to the memory; (e) access the boot up algorithm from the memory when the graphics controller is to boot up; (f) use a bandwidth corresponding to data bandwidth capabilities of the computing system to execute the boot-up algorithm; (g) obtain timing parameters of an associated display from one of the display or via default display settings; and (h) use the timing parameters to perform a boot-up graphics display.

* * * * *